United States Patent [19]

Lemercier

[11] 4,091,591

[45] May 30, 1978

[54] HEAT-INSULATING PANEL

[75] Inventor: Guy Lemercier, Le Puy Ste Reparade, France

[73] Assignee: Commissariat a l'Energie Atomique, Paris, France

[21] Appl. No.: 692,528

[22] Filed: June 3, 1976

[30] Foreign Application Priority Data

June 16, 1975 France .................. 75 18767

[51] Int. Cl.² .............................................. E04C 2/08
[52] U.S. Cl. .......................................... 52/613; 52/622
[58] Field of Search .................... 52/613–627, 52/410, 249; 29/191.4; 151/41.7, 41.73

[56] References Cited

U.S. PATENT DOCUMENTS

| | | | |
|---|---|---|---|
| 1,241,685 | 10/1917 | Van Dorn | 52/618 |
| 1,802,600 | 4/1931 | Hatch | 52/623 |
| 2,012,019 | 8/1935 | Owings | 52/617 |
| 2,132,642 | 10/1938 | Parsons | 52/618 |
| 2,445,801 | 7/1948 | Partiot | 29/191.4 |
| 2,784,758 | 3/1957 | Rohe | 151/41.7 |
| 2,846,167 | 8/1958 | Walsh | 52/620 |
| 3,178,026 | 4/1965 | Christy | 52/126 |
| 3,197,854 | 8/1965 | Rohe et al. | 151/41.7 |

Primary Examiner—James L. Ridgill, Jr.
Attorney, Agent, or Firm—Lane, Aitken, Dunner & Ziems

[57] ABSTRACT

The heat-insulating panel designed to be applied against a wall to be protected consists of two parallel sheet-metal sealing elements of small thickness which are welded together at their periphery and form an enclosed space in which is mounted a stack of thin wire-fabric elements and perforated plates or grids in alternate relation. The free spaces between the wire-fabric elements and the perforated plates communicate with each other and are filled with an inert gas. A leak-tight welded joint is formed between the non-perforated peripheral portion of the plates and the sheet-metal sealing elements.

7 Claims, 4 Drawing Figures

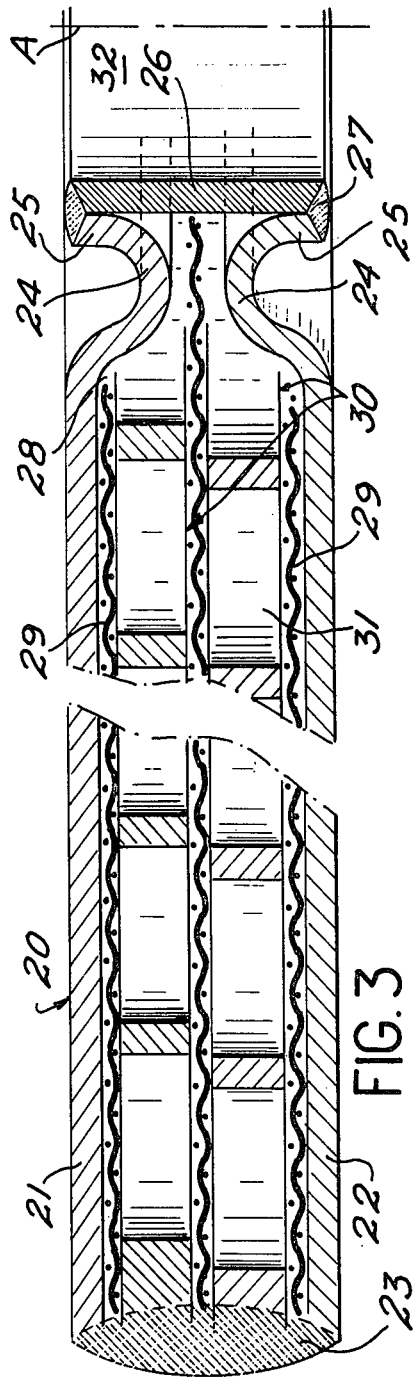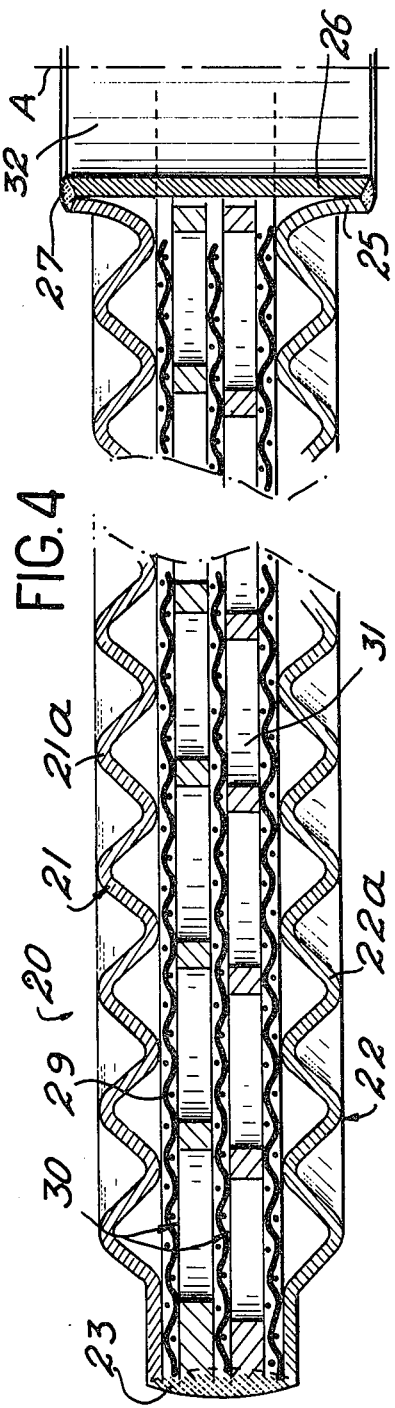

HEAT-INSULATING PANEL

This invention relates to a leak-tight heat-insulating panel which is designed to be mounted against the surface of a wall in order to protect this latter against the effects of a liquid or gaseous fluid which is heated to a high temperature. The invention applies more especially although not exclusively to the case in which said wall forms part of the structures of a fast nuclear reactor, e.g. the primary vessel which contains the liquid metal for cooling the reactor, the inner vessel which is immersed in said liquid metal, the concrete vault roof which performs the function of a primary vessel closure, the vessel support strakes, the sleeves through which reactor components penetrate into the primary vessel through the vault roof and so forth.

It is in fact known that, in reactors of this type, the reactor coolant contained in the primary vessel and usually consisting of liquid sodium is heated to a high temperature of the order of 500° C during reactor operation. An atmosphere of inert gas usually consisting of argon is present above the sodium level and beneath the reactor vault roof. Sodium vapor and aerosols collect in this atmosphere and, if no precautions were taken, would therefore be liable to come into direct contact with the reactor vault roof and with the top support strakes which serve to suspend the vessel from said roof. There would consequently be a potential danger of rapid damage to these structures as a result of corrosion effects combined with mechanical stresses arising from differential thermal expansions.

This invention relates to a leak-tight heat-insulating panel which is adapted to the operating conditions set forth in the foregoing and serves to protect the reactor structures against temperatures effects and also against the effects of corrosion by the liquid metal.

To this end, the panel under consideration is essentially constituted by a flat leak-tight enclosure which is capable of being applied against a wall to be protected, said enclosure being delimited by two parallel sheet-metal sealing elements of small thickness which are welded together at their periphery and form between them an enclosed space in which is mounted an alternate stack of wire-fabric or wire-mesh elements and perforated plates or grids which extend parallel to the plane of the thin sheet-metal sealing elements, the free spaces between the wire-fabric elements and the perforated plates being filled with an inert gas, the plates being pierced by holes which are uniformly spaced in the plane of said plates except in the perioheral region thereof in order to permit a leak-tight welded joint between said plates and said thin sheet-metal sealing elements.

Preferably, the two sheet-metal sealing elements of each panel are die-stamped in the central portion thereof in order to have two coaxial circular lips, said lips being welded to a tube element providing a penetration through the panel for a stud which serves to secure said panel to the wall.

In a first embodiment, the sheet-metal sealing elements have a contour in the shape of a regular polygon which is designed to permit continuous coverage of the wall to be protected by virtue of the juxtaposition of identical panels. As an advantageous feature, the regular-polygon contour of each panel is truncated at the vertices thereof in such a manner as to ensure that the juxtaposed assembly of panels provides between these latter free passages for the engagement of studs which serve to secure other panels disposed in superposed layers on the wall to be protected.

As a preferable feature, the holes of the superposed plates are relatively displaced in the lateral direction from one plate to the next in order to limit direct passages through the stack.

In accordance with another embodiment of the panel under consideration, the sheet-metal sealing elements of small thickness have a circular contour and are corrugated in concentric circles. In this alternative embodiment, the panels are applied against the wall to be protected in superposed layers in which the panels are relatively displaced laterally and obliquely from one panel to the next in order to ensure complete coverage of said wall.

Further properties of a leak-tight heat-insulating panel as constructed in accordance with the invention will become apparent from the following description of one example of application and of two alternative embodiments which are given by way of indication without any limitation being implied, reference being made to the accompanying drawings, wherein:

FIGS. 3 and 4 are half-views in transverse cross-section to a larger scale showing heat-insulating panels in accordance with two alternative embodiments.

Figure 1:
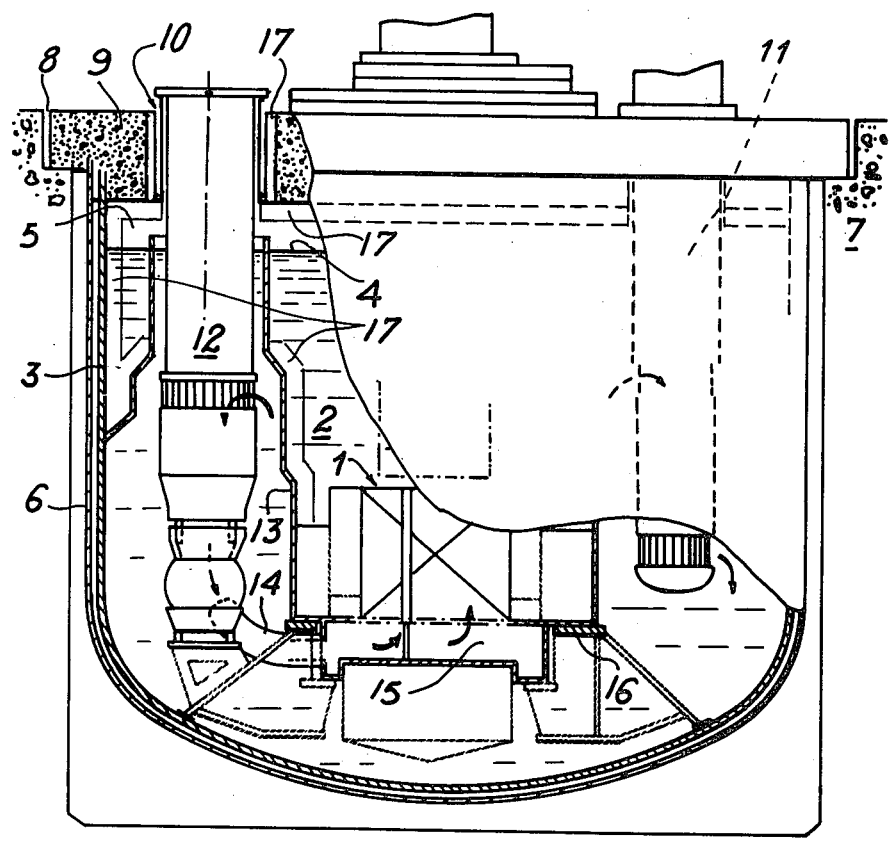
FIG. 1 is a schematic axial sectional view of a fast reactor in which leak-tight heat-insulating panels are provided in accordance with the invention for the protection of the internal structure.

In FIG. 1, the reference numeral 1 designates the core of a fast reactor of a type which is known per se. As shown in the figure, said reactor core 1 is immersed in a suitable volume of a liquid metal 2 and especially sodium which is intended to cool the core during reactor operation. Said liquid metal 2 is contained within a primary vessel 3 which is open at the top, an atmosphere 5 of an inert blanket gas consisting especially of argon being present within said vessel above the level of sodium as shown diagrammatically at 4. The primary vessel 3 is surrounded by a safety vessel or so-called leak-jacket 6, the assembly formed by these two vessels having a common vertical axis being placed within an outer containment vault 7 having thick concrete walls. The top portion of said vault is provided with a wide circular opening 8 in which is mounted a concrete vault roof 9. Said roof extends horizontally in a direction parallel to the level 4 of liquid sodium within the primary vessel 3 and is provided with openings 10 so as to permit assembly and access to the interior of the vessel 3 by components which are necessary for reactor operation such as, on the one hand, heat exchangers 11 and on the other hand pumps 12 for the circulation of sodium. This latter is brought to a high temperature at the outlet of the reactor core 1, is collected within an inner vessel 13 which is mounted within the primary vessel 3, then passes through the heat exchangers 11. After cooling, the sodium is finally recirculated at the heat-exchanger outlets within the space formed between the vessels 3 and 13. The cold sodium which is sucked-in by the pumps 12 is returned under pressure through discharge ducts 14 into a manifold 15 located beneath a diagrid 16 for supporting the reactor core 1, then passes again through the core and so on in a continuous operating regime.

Figure 2:
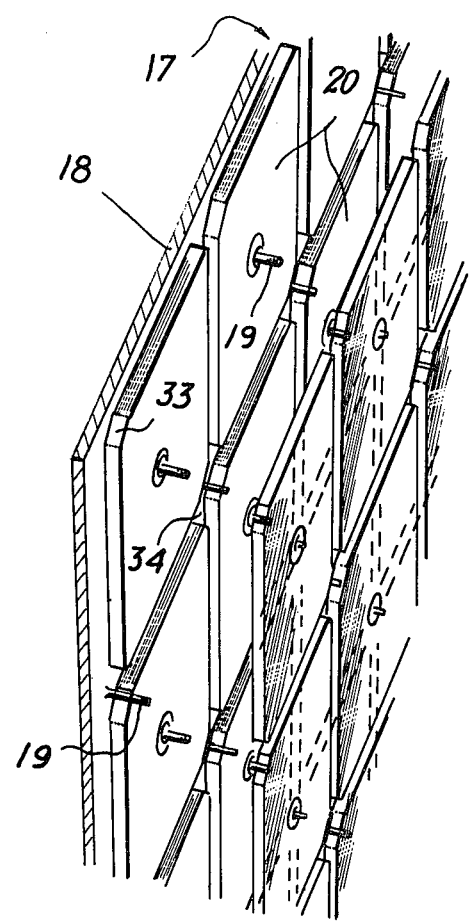
FIG. 2 is a detail sectional view in perspective showing the covering which is applied against a wall to be protected and constituted by the juxtaposed assembly of panels in accordance with the invention.

Under these conditions, in order to ensure protection of the reactor vault roof 9 and other internal structures of the reactor such as the suspension strakes or the upper portions of the primary vessel 3, the sleeves through which the components 11 and 12 are passed at the point of penetration of the vault roof 9, the lateral internal walls of the vessels 3 or 13, a heat-insulating covering as shown diagrammatically at 17 in FIG. 1 is placed against said walls to be protected. Said covering is formed by means of leak-tight panels in accordance with the invention, the constructional detail of which will hereinafter be more fully described. Reference will be made more especially to FIG. 2 which illustrates a view in partial perspective of the heat-insulating covering 17. Said covering is applied against a wall of the aforementioned type designated generally by the reference numeral 18 by means of studs 19 each having the function of supporting one heat-insulating panel 20, the covering being constituted by the continuous juxtaposition of similar panels.

As illustrated in FIG. 3 in connection with a first alternative embodiment, it is apparent that each panel as illustrated in this case to a larger scale in a transverse half-sectional view is limited by two sheet-metal sealing elements 21 and 22, said elements being formed of stainless steel, for example, by reason of the good heat conductivity and high corrosion resistance of this latter. These sheet-metal elements which are parallel to each other are securely joined together along their periphery by means of a weld seam 23 of substantial width and formed by arc-welding, argon-arc welding or electronic beam welding. The sheet-metal sealing elements 21 and 22 are each provided in the vicinity of their central portion with a hollow narrowed portion 24 formed by die-stamping and terminating in a lip 25 which is so arranged that the extremities of the two sheet-metal elements are placed in substantially coaxial relation to each other along two cylindrical portions. The extremities of said sheet-metal elements surround a tube element 26 which is finally welded at the ends against the lips by means of weld fillets 27.

The parallel sheet-metal elements 21 and 22, the peripheral weld seam 23 and the tube element 26 thus delimit a closed space 28 of annular shape about the axis A of symmetry of the panel. Said space 28 is placed under a low pressure of argon, for example, and is reserved for the preliminary mounting of a stack which enables the panel to perform its function of thermal barrier. In particular, said stack is formed by means of thin wire fabric elements 29 between which are disposed plates 30 of relatively greater thickness and each provided with a series of holes 31 suitably distributed through the thickness of said plates except for the periphery of these latter which is welded to the sheet-metal elements 21 and 22 by means of the seam 23. As an advantageous feature, the plates 30 are so arranged as to ensure that their holes 31 are substantially displaced from one plate to the next in order to limit and even ultimately to suppress a direct passage through said plates. Finally, the stud 19 which is associated with the panel in order to secure this latter against the wall to be protected as mentioned earlier is engaged within the bore 32 of the tube element 26, said element being delimited as hereinbefore described.

Referring again to FIG. 2, it can be seen that the panels 20 are arranged within the covering 17 in a plurality of successive layers. In the exemplified embodiment under consideration, said panels each have a contour in the shape of a regular polygon. The shape chosen in this example is square but could clearly be different on condition that the juxtaposed assembly of panels permits full coverage of the wall to be protected in a lattice having a predetermined pitch. In the case of square panels, it is advisable to employ at least two successive layers. Furthermore, in the corners of their external contour which is delimited by the sheet-metal sealing elements 21 and 22, said panels have truncated portions 33 so as to ensure that four adjacent panels 20 in any given layer delimit between them a recess 34 for the passage of a stud 19 which is capable of securing the panels forming part of the two previous layers and succeeding layers of the covering and so forth. Thus the panels in the successive layers are consequently displaced with respect to each other by one half-pitch.

The practical arrangements which are thus adopted for the construction of the panels and the assembly of these latter on the wall to be protected make it possible to establish between the atmosphere which is heated to a high temperature and charged with aerosols or the coolant liquid medium and the wall itself a high terminal gradient which is normal to the surface of said wall since the panels employed limit the transfer of heat from one to the other to a considerable extent. In particular, the heat conductivity of each panel is reduced to a very low value by the high porosity of the internal stack which can attain a space coefficient of at least 53%. This is due both to the perforations of the internal plates and to the assembly of the wire-fabric elements between these latter. It should further be noted that each contact made by the wires of said fabric elements between each other or with the perforated plates produces a thermal resistance which has the effect of limiting conduction even further. Moreover, the free spaces between said wire-fabric elements and the plates can advantageously be placed in a partial vacuum or in a low-pressure atmosphere of an inert gas and especially argon of the order of 50 mm of mercury at 20° C, which at the same time considerably limits convection. Finally, the wire-fabric elements themselves form screens which effectively prevent transmission of heat by radiation through each panel. It is also worthy of note that the elements constituting the panels can have a radius of curvature obtained by die-stamping which permits the construction of curved panels which are better adapted to the profiles of the same type of the walls to be protected.

In another alternative embodiment which is illustrated in FIG. 4, there are again found similar arrangements in regard to the stack of thin wire-fabric elements 29 and plates 30 of greater thickness, said stack being mounted within the closed space 28 delimited between the two sheet-metal sealing elements 21 and 22 of each panel. In this alternative embodiment, however, said sheet-metal elements are different from those illustrated in FIG. 3, especially in that they have surface corrugations designated respectively by the references 21a and 22a. Furthermore, these plates advantageously have circular contour whilst their corrugations extend in concentric circles about the axis A of each panel which passes through the center of the bore 32 traversed by the associated fixing stud.

Whilst all the properties set forth in the foregoing have been retained in this second alternative embodiment, an additional feature lies in the fact that the corrugations of the sheet-metal sealing elements facilitate differential expansions between the hot sheet-metal element placed in contact with the atmosphere at high temperature and the cold sheet-metal element which is in contact with the wall to be protected. By virtue of a better stress distribution, the overall effect of said corrugations is to achieve higher mechanical resistance to thermal shocks. Similarly, the choice of the diameter of the circular sheet-metal elements which defines the diameter of the panels applied against the wall to be protected makes it possible to maintain approximately flat surfaces against walls which themselves have a relatively long radius of curvature; furthermore, the friction forces resulting from temperature variations are more readily sustained by the webs formed in the thin sheet-metal sealing elements. In order to permit continuous coverage of the wall to be protected, it is necessary to superpose three successive layers in which these panels are relatively displaced both laterally and obliquely with respect to each other. There is thus obtained a reduction of thermal bridges resulting from the presence of sodium within the spaces between panels. It should finally be noted that these heat-insulating panels of circular shape are endowed with a high degree of adaptability in regard to the geometry of the wall to be covered. From this it accordingly follows that the bottom of a vessel which usually has the shape of a spherical cap joined to a cylinder can be covered or lined by modifying the diameters of the heat-insulating discs which are placed at successive levels.

In any case and whatever alternative form of construction may be adopted, the assembly of panels in a number of layers in which said panels are mounted in relatively displaced relation makes it possible both to facilitate the assembly and to ensure positional maintenance of said panels with respect to each other in the event of failure of a stud without any attendant danger of detachment of part or even the whole of the covering from the wall to be protected.

In one particular example of construction, the heat-insulating panels in accordance with the invention have an overall thickness of the order of 5.5 mm whilst the thin sheet-metal sealing elements have a thickness of 0.5 mm. The wire-fabric elements are preferably formed by a wire having a diameter of 0.11 mm (fabric having 100 meshes per Parisian inch (27.77 mm)). The perforated plates interposed between the thin wire-fabric elements have a thickness of the order of 1 mm. Finally, the tube elements provided at the center of the panels for the insertion of the fixing studs have a diameter within the range of 18 to 22 mm.

As will be readily understood, the invention is not applicable solely to the examples of construction which have been more especially described and illustrated but extends on the contrary to all alternative forms.

We claim:

1. A leak-tight heat-insulating panel comprising a flat enclosure which is capable of being applied against a wall to be protected, said enclosure being delimited by two thin sheet-metal sealing elements extending in parallel relation and welded together at their periphery so as to form between them an enclosed space filled with an inert gas, an alternate stack of wire-fabric elements and perforated plates mounted within said enclosed space and extending in a direction parallel to the thin sheet-metal sealing elements, the free spaces between the wire-fabric elements and the perforated plates communicating with each other, providing free movement of said inert gas throughout the entire enclosed space in said panel, said plates being pierced by holes uniformly spaced in the plane of said plates except in the peripheral region thereof in order to permit a leak-tight welded joint between said plates and said thin sheet-metal sealing elements, the thickness of said plates being greater than that of said wire-fabric elements.

2. A leak-tight heat-insulating panel according to claim 1, wherein the two thin sheet-metal sealing elements of each panel are each die-stamped in the central portion thereof in order to have two coaxial circular lips, said lips being welded to a tube element providing a penetration through the panel for a stud which serves to secure said panel to the wall.

3. A leak-tight heat-insulating panel according to claim 1, wherein the thin sheet-metal sealing elements have a contour in the shape of a regular polygon which is adapted to permit continuous coverage of the wall to be protected by virtue of the juxtaposed assembly of identical panels.

4. A leak-tight heat-insulating panel according to claim 3, wherein the regular-polygon contour of each panel is truncated at the vertices thereof in such a manner as to ensure that the juxtaposed assembly of panels provides free passages between said panels for the engagement of studs which serve to secure other panels disposed in superposed layers on the wall to be protected.

5. A leak-tight heat-insulating panel according to claim 1, wherein the holes located at intervals in the superposed plates are relatively displaced in the lateral direction from one plate to the next in order to limit direct passages through the stack.

6. A leak-tight heat-insulating panel according to claim 1, wherein the thin sheet-metal sealing element are corrugated in concentric circles.

7. A leak-tight heat-insulating panel according to claim 6, wherein the thin sheet-metal sealing elements have a circular contour.

* * * * *